Dec. 29, 1959 W. G. LE TARTE 2,918,950
SAWING MACHINE HAVING A PAIR OF ANGULARLY
POSITIONED SAWS FOR CUTTING BEVELS
Filed Sept. 23, 1957 3 Sheets-Sheet 1
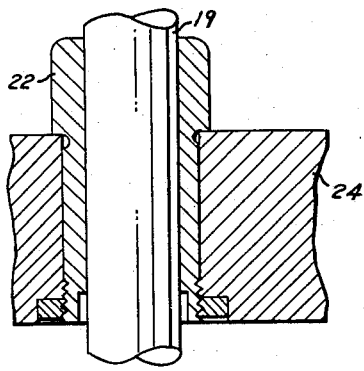
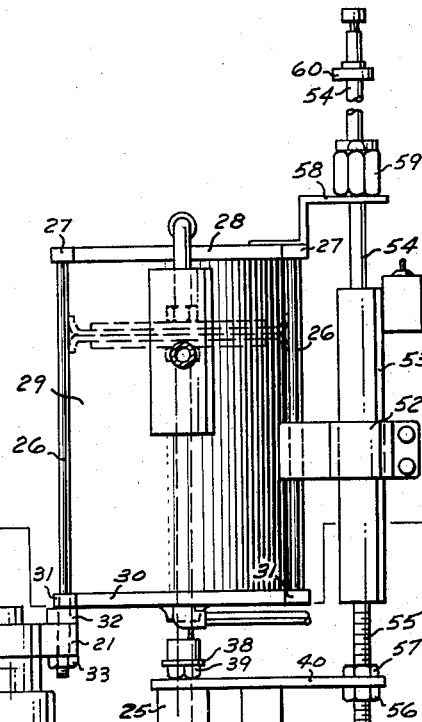
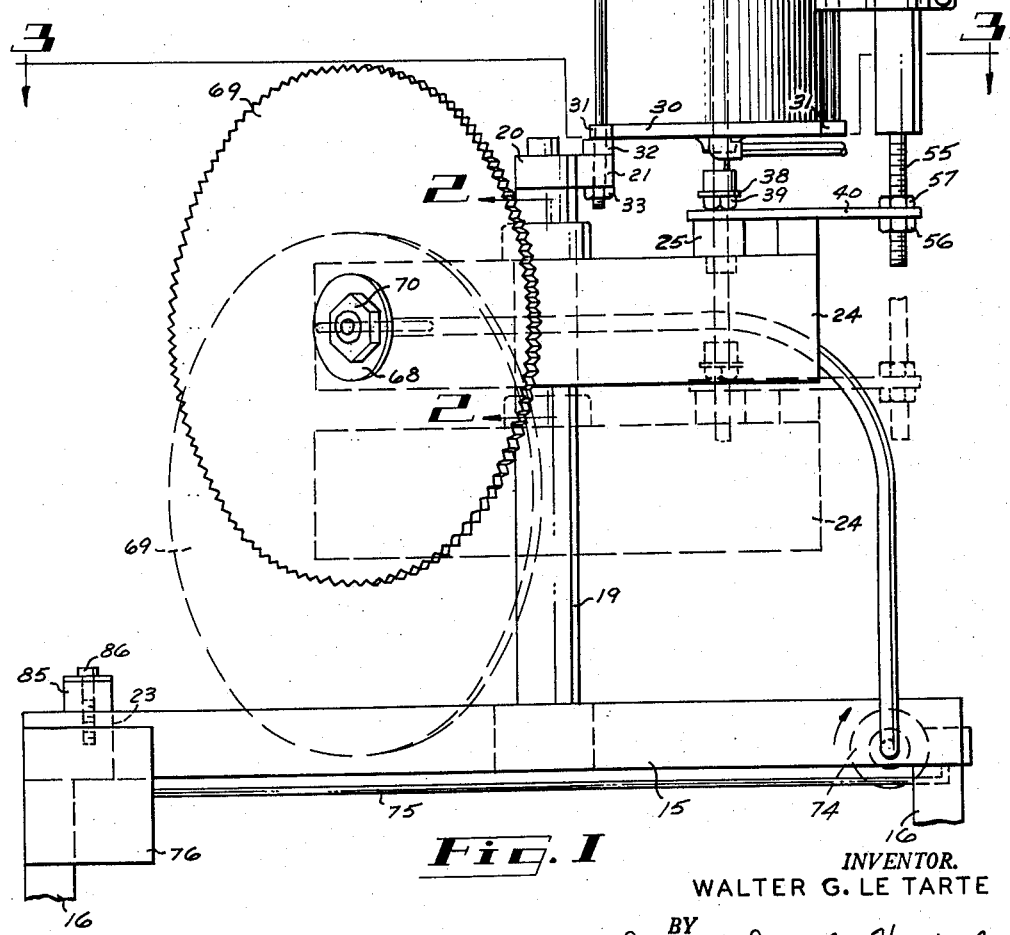
INVENTOR.
WALTER G. LE TARTE
BY
Donnelly, Mentag & Harrington
ATTORNEYS Dec. 29, 1959 W. G. LE TARTE 2,918,950
SAWING MACHINE HAVING A PAIR OF ANGULARLY
POSITIONED SAWS FOR CUTTING BEVELS
Filed Sept. 23, 1957 3 Sheets-Sheet 2

INVENTOR.
WALTER G. LE TARTE

BY
Donnelly, Mentag & Harrington

ATTORNEYS

Dec. 29, 1959 W. G. LE TARTE 2,918,950
SAWING MACHINE HAVING A PAIR OF ANGULARLY
POSITIONED SAWS FOR CUTTING BEVELS
Filed Sept. 23, 1957 3 Sheets-Sheet 3

INVENTOR.
WALTER G. LE TARTE
BY
Donnelly, Mentag & Harrington
ATTORNEYS

United States Patent Office 2,918,950
Patented Dec. 29, 1959

2,918,950

SAWING MACHINE HAVING A PAIR OF ANGULARLY POSITIONED SAWS FOR CUTTING BEVELS

Walter G. Le Tarte, East Detroit, Mich.

Application September 23, 1957, Serial No. 685,747

5 Claims. (Cl. 143—38)

My invention relates to a new and useful improvement in a sawing machine in which a pair of power driven saws is used to cut a bar, rail or the like on a bevel.

The invention is particularly adapted for cutting the side and end rails of window frames, screen frames, and so forth, and especially when such rails are formed from metal.

In the use of the invention, when the bar or rail of metal is operated upon by the saws, a bevel for one end of the rail is cut and a bevel for the opposite end of another rail is cut.

A sawing machine capable of cutting a pair of bevels simultaneously is shown in United States Patent No. 2,722,731, issued November 8, 1955.

In the use of such a machine, such as shown in the patent referred to, it was discovered that it would be desirable to have the saws so mounted that the relative angularity could be easily and quickly varied, thus accommodating the machine to a quick adjustment for cutting bevels of different angles.

It is an object of the present invention to provide a sawing machine having a pair of angularly positioned saws so mounted and constructed that their relative angularity may be easily and quickly adjusted.

Another object of the invention is the provision of a power operated means for moving the saws in unison relatively to the workpiece to be operated upon.

Another object of the invention is the provision of a simple and effective means for controlling the moving mechanism.

Another object of the invention is the provision of a sawing machine of this class embodying these features and of such a construction that it may be economically maintained, easily and quickly operated, and highly efficient in use.

Other objects will appear hereinafter.

It is recognized that various modifications and changes may be made in the detail of the structure illustrated, and it is intended that the present disclosure shall be considered to be but the preferred embodiment.

Forming a part of this application are drawings, in which:

Fig. 1 is a side elevational view of the invention;

Fig. 2 is a fragmentary sectional view taken on line 2—2 of Fig. 1;

Figure 3:
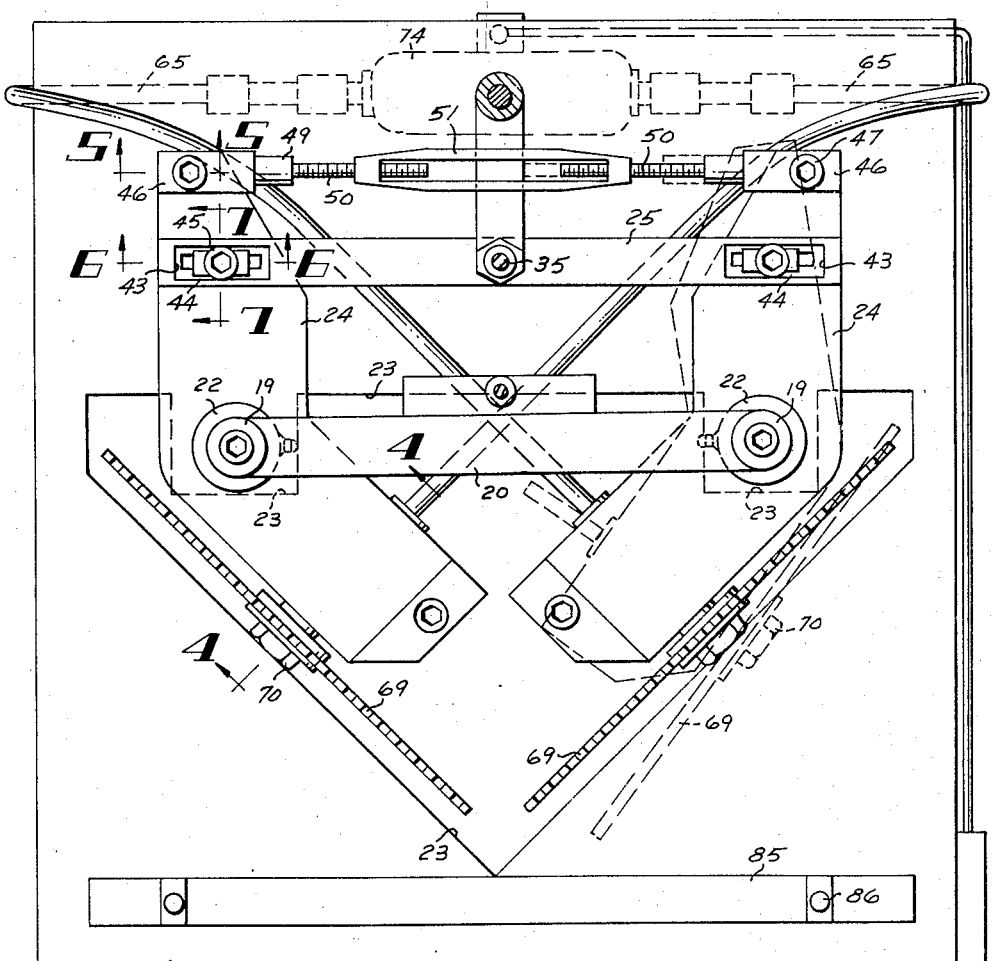
Fig. 3 is a plan view taken on line 3—3 of Fig. 1.

In the drawings I have illustrated the invention used with a table or workpiece supporting platform 15 supported by legs 16. A pair of guide posts 19 project upwardly from the base or table 15 in spaced relation to each other. These guide posts are connected adjacent their upper ends by a bar 20. The supporting table or platform 15 is cut away as at 23, this cut away being clearly illustrated in Fig. 3. Projecting from one side of this bar 20 is a supporting member 21. The guide posts 19 extend through the bushings 22 which are mounted in the saw supporting members 24. (See Fig. 2.) These saw supporting members 24 are rotatably mounted on the guide posts 19. A bar 25 serves to connect these members 24 adjacent their rearward ends, and the method of connection at each end of the bar 25 is the same, so the description of one will suffice for both.

Figure 8:
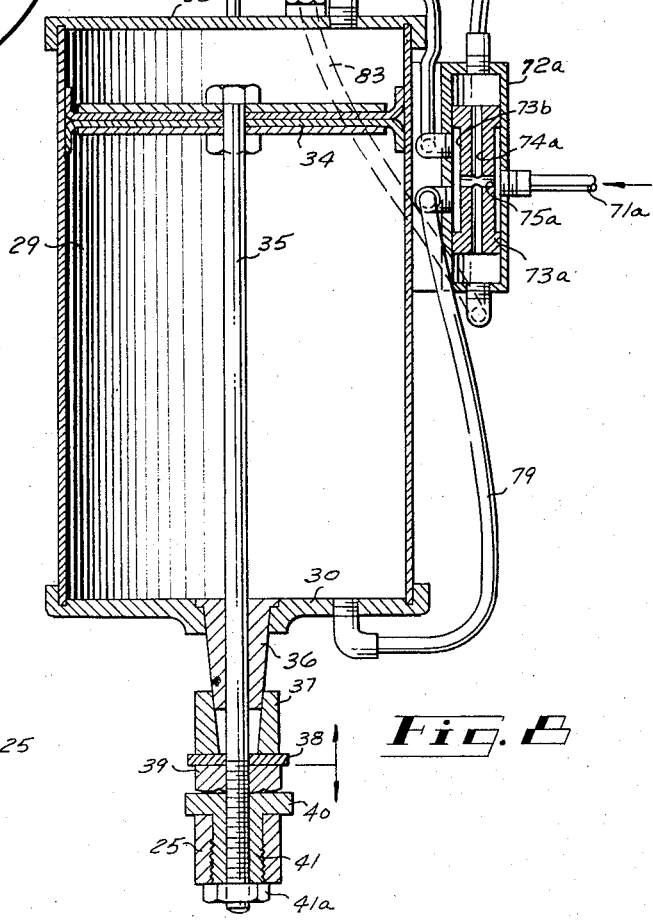
Fig. 8 is a sectional view taken on line 8—8 of Fig. 9.

Extended through the projection 21 and secured thereto by the nuts 32 and 33, as shown in Fig. 1, is a rod 26 which is screwed into a boss 27 of the cover 28 of a cylinder 29. This rod 26 projects through a boss 31 formed on the bottom 30 of the cylinder and also projects through the member 21 and is secured thereto by the nuts 32 and 33, as shown in Fig. 1. Slidable in the cylinder 29, as shown in Fig. 8, is a piston 34 connected to which is a piston rod 35 extended outwardly through the neck 36 on which is secured a nut 37 bearing against which is a washer 38 of sealing material held in position by a nut 39 threaded on the rod 35. This rod 35 threads into a bushing 41 which is threaded into the bar 25. A nut 41a is threaded on the end of the rod 35 so that a rigid connection is established between the piston 34 and the bar 25.

Figure 6:
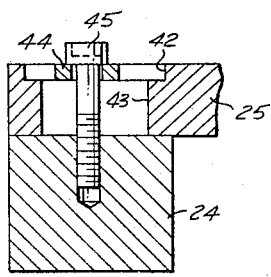
Fig. 6 is a fragmentary sectional view taken on line 6—6 of Fig. 3.

Each of the members 24 adjacent the rear end thereof is provided with a slot 43 formed therethrough communicating with the recess 42, as shown in Fig. 6. A washer 44 spans this recess 42 and through this washer is projected a screw 45 which is threaded into the member 24. This is also clearly shown in Fig. 3. In this manner the members 24 are rigidly connected to the bar 25 so that they will move in unison with the movement of the piston 34.

Figure 5:
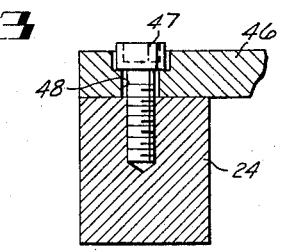
Fig. 5 is a fragmentary sectional view taken on line 5—5 of Fig. 3.
Figure 9:
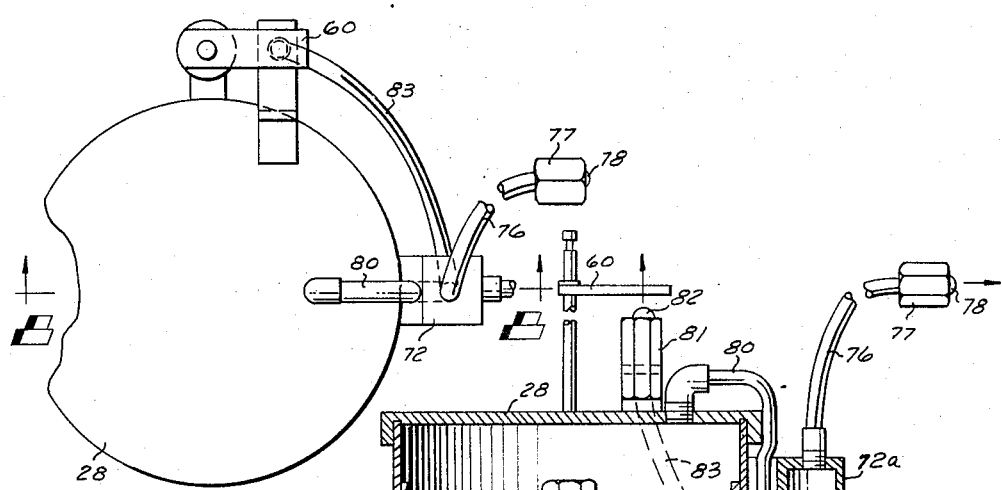
Fig. 9 is a top plan view of a cylinder used in the invention.
Figure 7:
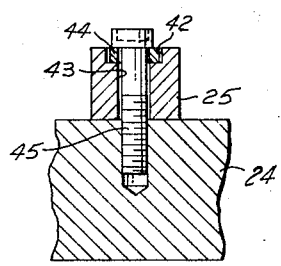
Fig. 7 is a fragmentary sectional view taken on line 7—7 of Fig. 3.

As shown in Fig. 5, there is mounted on each of the members 24 by means of a screw 47 a plate 46, the opening 48 through the plate 46 allowing clearance with the screw 47. This plate 46 carries the projection 49 (Fig. 3) extended outwardly from which is a threaded rod 50 threading into a turn-buckle 51. By loosening the bolts 45 and turning the turn-buckle 51 the members 24 may be swung on their pivots relatively to each other.

Mounted on one of the rods 26 which extend between the bottom 30 and the top 28 of the cylinder 29 by means of a bracket arm 52 is a housing 53 through which slidably projects a rod 54. This rod 54 has a threaded portion 55 which projects the arm 40 which forms a part of the bushing 41. The location of this arm 40 relatively to the rod 54 may be adjusted by means of the nuts 56 and 57 shown in Fig. 1. Consequently, as the piston moves relatively to the cylinder, the rod 54 will also move longitudinally of its housing 53.

Mounted on the cover 28 of the cylinder, as shown in Fig. 1, is a bracket arm 58 which serves as a support for a valve housing 59. Mounted on the rod 54 is an arm 60 which overlies the valve housing 59 as shown in Fig. 1, and in Fig. 8.

Figure 4:
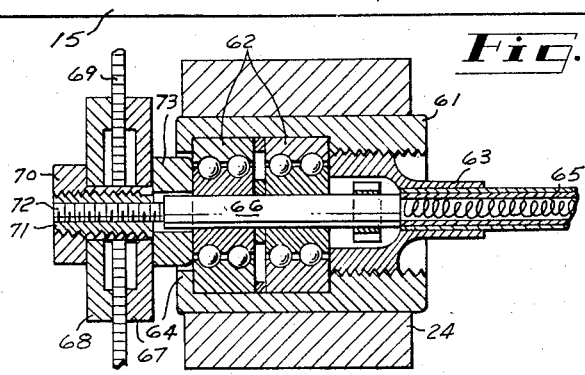
Fig. 4 is a fragmentary sectional view taken on line 4—4 of Fig. 3.

As shown in Fig. 4, there is mounted on each of the members 24 a bushing 61 in which are mounted bearings 62 held in engagement with the flange 64 of the bushing 61 by means of the fitting 63 which is threaded into the bushing 61 as shown in Fig. 4. A flexible shaft 65 is provided with a portion 66 which is projected into the bearings 62. This shaft has a threaded portion 72 and on this threaded portion there is mounted a saw 69 positioned at the opposite sides of which are the clamping plates 67 and 68. These clamping plates are held in clamping relation to the saw 69 by the nut 70 which is threaded on a sleeve 71 which carries the head 73. In this manner the saws are mounted non-rotatably relatively to the driving shaft. These flexible shafts 65 are driven by an electric motor 74 leading to which is an electric wire 75 proceeding from the switch-box 76 shown in Fig. 1. When the switch is closed the motor 74 will operate and the saw blades will be rotated.

The valve housing 72a (Fig. 8) is mounted on the cylinder 29 and leading into this valve housing is a pipe 71a connected to a suitable source of fluid under pressure. I prefer to use air pressure although it will be obvious that the mechanism might be equally as well hydraulically operated. Slidable in this valve housing 72a is a valve spool 73a having a longitudinal passage 74a formed therethrough connected with the diametrical passage 75a. It will be noted from an examination of Fig. 8 that this spool 73a is cut away as at 73b.

Communicating with the valve housing 72a at the cut away portion 73b is a conduit 79 which also communicates with the interior of the cylinder 29 through the bottom 30 thereof. A conduit 80 communicates with the interior of the housing 72a at the cut away portion 73b and also communicates through the top 28 of the cylinder 29. A valve housing 81 having the manually operated valve 82 is connected by means of the conduit 83 with the valve housing 72a through the bottom thereof. A conduit 76 connects through the top of the valve housing 72a with a valve housing 77 having the manually operable valve 78 thereon.

The particular construction of these manually operable valves forms of itself no part of the present invention and is a well-known type, so that a detailed showing of the same has not been resorted to.

In operation, the operator would place upon the supporting platform 15 the material to be cut and would position this material in engagement with the abutment bar 85 which is adjustably mounted by the bolt and nut 86 on the support 15. When the work material is in proper position and the saws are rotating, the operator would then lower the saws from the full-line position to the dotted-line position shown in Fig. 1. This lowering of the saws is effected by pressing on the valve member 78 so as to open it. This would establish communication with the lower part of the cylinder through the conduit 79 and the valve housing 72 and conduit 76 with the atmosphere.

Air under pressure would then, moving through the conduit 80, force the piston downwardly. This downward movement would continue until the arm 60 contacted the member 82 so as to open the conduit 83 to the atmosphere. Thus the conduit 76 and the conduit 83 would both be open to the atmosphere and further movement of the piston would be prevented. When it is desired to move the piston upwardly, the pressure on the valve member 78 would be released so as to close this valve and thus the conduit 76 would no longer be in communication with the atmosphere and the air under pressure would proceed through the conduit 79, forcing the piston upwardly. During this upward movement of the piston 34 the valve 82 would be held open.

In Fig. 3, I have illustrated one of the saws 69 adjusted to a dotted line position. Both of the saws may be simultaneously adjusted or individually adjusted in the manner already described.

Experience has shown that a sawing machine constructed and operated in this manner is highly efficient in use and also highly productive.

What I claim is:

1. A sawing machine of the class described, comprising: a supporting body; a pair of spaced apart guide posts mounted on and projecting upwardly from said body; a saw carrying member slidably and swingably mounted on each of said guide posts intermediate its ends; a saw mounted on the forward end of each of said carrying members, said carrying members being so arranged as to retain said saws in angular relation to each other; means for rocking each of said carrying members on a guide post as a pivot for varying the relative angularity of said saws; means for securing said saw carrying members against rockable movement on a guide post after adjustment of said angularity; a flexible shaft connected with each of said saws; power driven means for rotating said shafts in unison; fluid operated means for raising and lowering said saw carrying members on said guide posts; hand operated means for controlling said fluid operated means; and abutment means movable upwardly and downwardly in unison with said saw carrying members for, upon moving downwardly a predetermined distance, operating a fluid control member for preventing further downward movement of said saw carrying members.

2. A sawing machine of the class described, comprising: a supporting body; a pair of spaced apart guide posts mounted on and projecting upwardly from said body; a saw carrying member slidably and swingably mounted on each of said guide posts intermediate its ends; a saw mounted on the forward end of each of said carrying members, said carrying members being so arranged as to retain said saws in angular relation to each other; means for rocking each of said carrying members on a guide post as a pivot for varying the relative angularity of said saws; means for securing said saw carrying members against rockable movement on a guide post after adjustment of said angularity; a flexible shaft connected with each of said saws; power driven means for rotating said shafts in unison; fluid operated means for raising and lowering said saw carrying members on said guide posts; hand operated means for controlling said fluid operated means; abutment means movable upwardly and downwardly in unison with said saw carrying members for, upon moving downwardly a predetermined distance, operating a fluid control member for preventing further downward movement of said saw carrying members; and means for adjusting said abutment member upwardly and downwardly for regulating the position of downward movement of said saw carrying members.

3. A sawing machine of the class described, comprising: a supporting body; a pair of spaced apart guide posts mounted on and projecting upwardly from said body; a pair of saw carrying members each swingably and slidably mounted on one of said guide posts; a saw carried on one end of each of said saw carrying members, said members being so positioned as to retain said saws in angular relation to each other; means securing said saw carrying members against rotative movement on said guide posts; a turn-buckle mechanism connected to one end of each of said saw carrying members adapted, upon release of said securing means, for, upon being rotated, moving said saw carrying members relatively to each other to vary the relative angularity of said saws.

4. A sawing machine of the class described, comprising: a supporting body; a pair of spaced apart guide posts mounted on and projecting upwardly from said body; a pair of saw carrying members each swingably and slidably mounted on one of said guide posts; a saw carried on one end of each of said saw carrying members, said members being so positioned as to retain said saws in angular relation to each other; means securing said saw carrying members against rotative movement on said guide posts; a turn-buckle mechanism connected to one end of each of said saw carrying members adapted, upon release of said securing means, for, upon being rotated, moving said saw carrying members relatively to each other to vary the relative angularity of said saws; a cylinder for reception of fluid under pressure; a piston slidably mounted in said cylinder; a piston rod connected to said piston; means for connecting said piston rod to said saw carrying members for effecting upward and downward movement of the same in unison with the upward and downward movement of said piston rod; a valve housing for reception of fluid under pressure; a conduit leading from said valve housing on opposite ends of said cylinder; and valve mechanism operable for controlling the flow of fluid into either end of said cylinder.

5. A sawing machine of the class described, comprising: a supporting body; a pair of spaced apart guide posts mounted on and projecting upwardly from said body; a pair of saw carrying members each swingably and slidably mounted on one of said guide posts; a saw carried on one end of each of said saw carrying members, said members being so positioned as to retain said saws in angular relation to each other; means securing said saw carrying members against rotative movement on said guide posts; a turn-buckle mechanism connected to one end of each of said saw carrying members adapted, upon release of said securing means, for, upon being rotated, moving said saw carrying members relatively to each other to vary the relative angularity of said saws; a cylinder for reception of fluid under pressure; a piston slidably mounted in said cylinder; a piston rod connected to said piston; means for connecting said piston rod to said saw carrying members for effecting upward and downward movement of the same in unison with the upward and downward movement of said piston rod; a valve housing for reception of fluid under pressure; a conduit leading from said valve housing on opposite ends of said cylinder; valve mechanism operable for controlling the flow of fluid into either end of said cylinder; and means operable, upon downward movement of said piston a predetermined distance, for operating said valve mechanism for stopping further downward movement of said piston.

References Cited in the file of this patent

UNITED STATES PATENTS

| | | |
|---|---|---|
| 181,897 | Bahse et al. | Sept. 5, 1876 |
| 499,293 | Hinkley | June 13, 1893 |
| 549,318 | Johnson et al. | Nov. 5, 1895 |
| 553,009 | Luther | Jan. 14, 1896 |
| 1,307,547 | Hasty | June 24, 1919 |
| 1,543,051 | Bloodgood | June 23, 1925 |
| 2,022,289 | Knapp | Nov. 26, 1935 |
| 2,511,563 | Bullard | June 13, 1950 |
| 2,722,731 | Le Tarte | Nov. 8, 1955 |
| 2,814,319 | Hetman et al. | Nov. 26, 1957 |
| 2,856,973 | Horton | Oct. 21, 1958 |